United States Patent [19]

Smith

[11] 4,122,522

[45] Oct. 24, 1978

[54] AIRCRAFT GROUND MONITORING SYSTEM

[76] Inventor: Gerald R. Smith, 2845 Clearview Pl., Atlanta, Ga. 30341

[21] Appl. No.: 802,662

[22] Filed: Jun. 2, 1977

Related U.S. Application Data

[63] Continuation of Ser. No. 471,609, May 20, 1974, abandoned.

[51] Int. Cl.$^2$ ........................ G06F 15/50; B64C 13/18

[52] U.S. Cl. .................................. 364/427; 73/178 T; 340/26; 364/428

[58] Field of Search ........................ 235/150.2, 150.22; 340/26, 27 R; 73/178 T; 364/427, 428

[56] References Cited

U.S. PATENT DOCUMENTS

| | | | |
|---|---|---|---|
| 3,077,110 | 2/1963 | Gold | 73/178 T |
| 3,086,394 | 4/1963 | Peck | 235/150.22 X |
| 3,159,738 | 12/1964 | James et al. | 235/150.22 X |
| 3,182,498 | 5/1965 | Koletsky et al. | 73/178 T |
| 3,192,503 | 6/1965 | Lang | 73/178 T X |
| 3,504,335 | 3/1970 | Hall et al. | 73/178 T X |
| 3,706,969 | 12/1972 | Paredes | 340/26 |

*Primary Examiner*—Jerry Smith
*Attorney, Agent, or Firm*—Jones, Thomas & Askew

[57] ABSTRACT

System for monitoring performance of an aircraft during ground-related operating condition, such as take-off and landing, to predict whether the aircraft can safely complete the operation. The performance of various known types of aircraft is predicted as a function of the distance which the aircraft has traveled along a runway. The actual progress of a known type of aircraft along a runway is then monitored to determine the actual velocity and position of the aircraft. Using the performance model for the known aircraft type, the remaining distance required for the aircraft to accomplish a particular operation, such as to reach take-off velocity or to decelerate to a stop, is predicted. The predicted distance is compared with the actual runway distance remaining for the aircraft to travel, and an alarm signal condition is generated if the actual remaining distance is less than the predicted required distance. The comparison is also made between the measured velocity of an aircraft moving along the runway and the predicted velocity which that type of aircraft should have attained, at various locations along the length of the runway. A warning signal is generated if the actual velocity is unacceptably different from predicted. The present system also predicts safe abort pcints conditions. Runway/taxiway intersection monitoring and control is also provided.

11 Claims, 5 Drawing Figures

AIRCRAFT GROUND MONITORING SYSTEM

This is a continuation of application Ser. No. 471,609, filed May 20, 1974, and now abandoned.

This invention relates in general to aircraft performance monitoring and in particular to a system for monitoring the performance of aircraft during ground-related activities.

The tremendous growth in air transportation has resulted in a corresponding increase in aircraft traffic at major domestic airports. The numbers and types of aircrafts utilized in commercial and noncommercial air transportation have increased with the growth of the industry. The many types of aircraft have a wide range of take-off and landing characteristics. For example, a large and fully loaded aircraft may require more than 10,000 feet of runway for a normal take-off, depending on atmospheric conditions and other variables; whereas a smaller aircraft, or one that is partially loaded, requires only 5,000 to 8,000 feet. Furthermore, uncontrolled variables such as meteorological conditions can cause widely variable take-off distance requirements for any particular aircraft at a given gross weight and power setting.

Likewise, the distance required to stop an aircraft during landing or during take-off abort varies greatly with factors such as aircraft type, gross weight, and runway surface conditions. Consequently, the decision whether to abort a take-off or landing, should the need exist, must be based on a hasty evaluation of a set of inter-related data. This evaluation has to be completed by the flight crew prior to the initiation of any abort action.

The performance of an aircraft during a ground operation such as take-off, for example, is presently monitored manually by the flight crew during the action operation. Since runway remaining-distance markers are not presently required to be installed along runways at commercial airports, the pilot must visually observe the end of the runway while he monitors aircraft velocity during the take-off run to determine if there is sufficient runway remaining for a safe take-off. Even though thrust measurements are made by on-board equipment and displayed for the flight crew, the pilot must largely rely on his judgment to evaluate aircraft velocity versus runway distance during take-off. That judgment is subject to human error because of the number of factors which must be evaluated in a very short time span. Furthermore, take-off parameters such as estimated gross weight, critical engine failure velocity ($V_c$), rotation velocity ($V_r$), take-off velocity ($V_t$), flap setting, throttle setting, and meteorological data, are subject to human miscalculation and erroneous evaluation. Since a take-off is presently allowed with 1500 feet visibility, it is obviously impossible to determine whether the aircraft is too close to the end of the runway until it is too late to safely abort. Take-offs at night and during instrument flight conditions also make visual sighting of the runway end a practical impossibility. It is apparent that the need to observe and evaluate the foregoing information, along with assimilating the other visual and audible inputs occurring during a take-off operation, places a heavy burden upon the physical and mental capabilities of the flight crew.

Prior art proposals for monitoring aircraft take-off performance, for example, generally involve on-board equipment which must be manually supplied with various data such as aircraft gross weight, flap setting, throttle setting, critical speeds, runway length, and the like, prior to commencing the take-off run. Such proposed equipment would also monitor actual performance variables such as aircraft velocity and acceleration, and would provide a comparison signal to the flight crew. The practical problems associated with such proposed solutions, as well as the expense of providing nonmandatory on-board equipment, has precluded its commercial utilization. The need to provide a number of data input settings to the on-board equipment prior to take-off only increases the possibility that an erroneous setting will provide the pilot with a false "abort" signal or, worse yet, would delude the pilot into believing he could achieve take-off velocity when, in fact, he was running out of runway. Moreover, the need to provide what is essentially a special-purpose on-board computer to monitor take-off performance of each individual aircraft further adds to the expense and complexity of the aircraft, and reduces the available revenue payload of the aircraft.

The need for an effective ground monitor exists for other aircraft and ground operations such as for abort monitoring for both take-off and landing, and for monitoring surface movement of aircraft and other vehicles on airport taxiways. Airport surface detection equipment (ASDE) radar currently in use at several airports has not proven to be an effective aid to assist controllers in controlling ground traffic. Such equipment is generally unreliable for the identification of airport traffic movements because of blind spots, the inability of the equipment to distinguish aircraft from other vehicles, and the degradation of target definitions during periods of moderate to heavy precipitation. Published reports of aircraft accidents which occurred during take-off and landing operations have recognized that the lack of an effective system for monitoring aircraft ground performance is a factor in many such accidents.

Accordingly, it is an object of the present invention to provide an improved system for monitoring the groundrelated performance of aircraft.

It is another object of the present invention to provide a system for monitoring the performance of aircraft during operations such as take-off and landing, and to provide the flight crew with an early indication of inadequate performance of the aircraft.

It is sill another object of the present invention to provide a system for predicting whether an aircraft takeoff or landing can be safely aborted.

It is yet another object of the present invention to provide an aircraft ground performance monitoring system which is substantially ground-based, requiring little or no apparatus on board the aircraft.

Other objects and advantages of the present invention will become more readily apparent from the following description of disclosed embodiments, including the figures in which.

Figure 1:
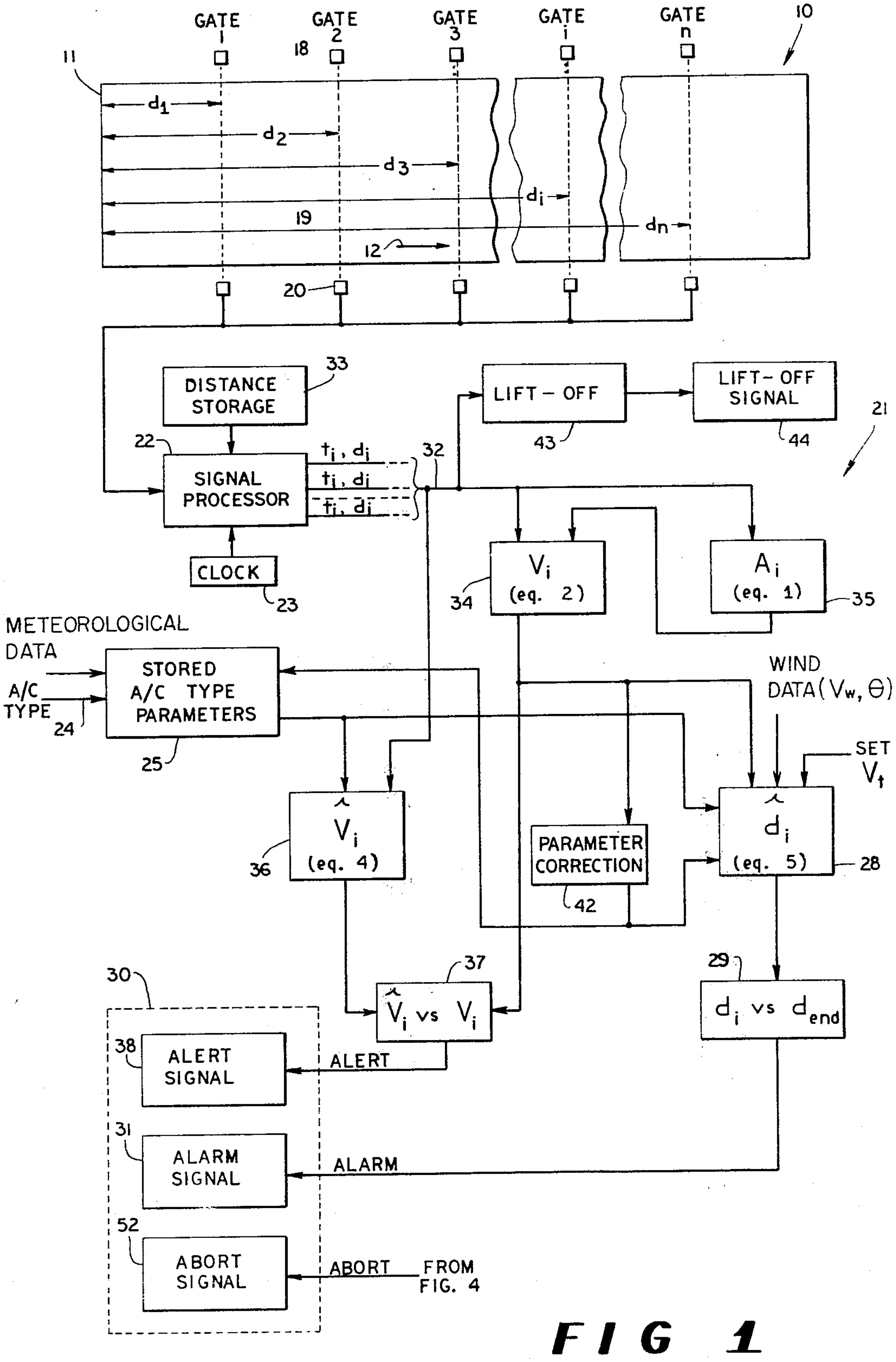
FIG. 1 is a schematic illustration, in somewhat functional form, of an illustrative embodiment of the invention as used to monitor aircraft take-off performance.

Throughout the present discussion the critical engine failure velocity of an aircraft is referred to as "$V_c$38 , and the take-off velocity is referred to as "$V_t$", although it is recognized that the corresponding velocities are also known as $V_1$ and $V_2$, respectively.

Stated in general terms, the system of the present invention predicts a parameter related to the performance of an aircraft as that aircraft is moving along a runway, determines the actual progress of the moving aircraft to determine the actual value of the parameter, and then compares the actual and predicted values to determine whether aircraft performance is sufficient for the operation being performed. One of the significant aspects of the present invention lies in the determination that a measureable performance quantity, such as velocity, of an aircraft traveling along a runway can be closely correlated with the amount of distance which the aircraft has traveled along the runway, and that certain other variable parameters have an acceptably small effect on the correlation. Predicted values of the measurable quantity are determined at a number of locations along a runway; and the predetermined correlation parameters for the identified type of aircraft are adjusted for the particular specific aircraft, following a comparison of predicted versus actual performance.

The system of the present invention monitors the velocity and position of an aircraft on a runway during takeoff and landing, and predicts whether the aircraft is capable of accelerating (or decelerating) to a critical speed for take-off (or safe landing roll-out). The flight crew is advised of predicted inadequate performance by a suitable signal means, such as warning lights mounted along the runway or a data link to the aircraft. While it is not the intention of the present system to provide a mechanized substitute for the judgment of the aircraft flight crew, who are ultimately responsible for operational decisions, the present system does provide a real-time analysis and an early prediction of aircraft performance which affect critical aircraft ground operations, and also provides the flight crew with an early "go-no go" analysis upon which they can make their decision. The present system thus actually relieves pilots and flight controllers of the present need to arrive at a mental "go-no go" decision based on consideration of many physical data inputs.

The present system is more readily understood by referring to the illustrative embodiment thereof as described below with reference to FIG. 1. A runway schematically indicated at 10 is intersected along its length by a number of gates 1, 2, 3, . . . $n$ located at intervals along the length of the runway. Each of the gates is located at respective known distances $d_1$, $d_2$, $d_3$, . . . $d_n$ from the threshold 11 of the runway. Each of the gates operates to provide a signal condition whenever an aircraft passes through the particular gate; the gates are discussed in further detail below. Since the gates are located at known fixed distances from the threshhold 11, which may be considered as a reference location, it will be understood that the identification and time at which a particular gate is crossed can be used to compute aircraft velocity and acceleration between gates, and to determine the location of the aircraft on the runway.

Time, distance, velocity, and acceleration are the major parameters which define aircraft performance during operations such as take-off, take-off abort, and landing roll-out. Considering an aircraft moving along the runway 10 in the direction indicated by the arrow 12, assume that the aircraft in turn passes gates $(i-1)$, $i$, and $(i+1)$. The distance of each gate from the runway threshold 11 is known, and the times that the aircraft crosses each of the gates is readily determinable. Although the acceleration of an aircraft along the runway is not constant, the acceleration A of the aircraft between any two gates may be practicably considered as a constant if adjacent gates are sufficiently close together compared with the total length of the runway. With this assumption of acceleration A, it can be shown that:

$$A_i = A_{i-1,\, i+1} = \frac{2\left(\frac{d_{i+1} - d_i}{t_{i+1} - t_i} - \frac{d_i - d_{i-1}}{t_i - t_{i-1}}\right)}{t_{i+1} - t_{i-1}} \quad (1)$$

where $A_i$ equals acceleration at the $i$th gate, and $t_{i-1}$, $t_i$, and $t_{i+1}$ equal time at which the aircraft crosses the respective gates.

In accordance with the equation (1), acceleration versus time is accurately approximated as a "stairstep" function and velocity versus time is approximated by a straight line between the time points. Therefore, it can be shown that:

$$V_i = \frac{d_i - d_{i-1}}{t_i - t_{i-1}} + A_i\left(t_i - \frac{t_{i-1} + t_i}{2}\right) \quad (2)$$

where $V_i$ equals velocity at the $i$th gate.

An aircraft traveling along a runway is subjected to forces of drag and thrust, and the acceleration or deceleration of the aircraft is determined by the difference between drag and thrust. Those skilled in the art recognize that drag may be divided into basic drag components such as wing profile drag, wing induced drag, parasite drag, and drag due to the friction of landing gear wheels. All of the aforementioned drag components are proportional to the square of the aircraft velocity, except for wheel friction drag which is substantially constant once the aircraft take-off roll commences. The thrust of a jet aircraft basically consists of jet thrust, pressure thrust, and engine ram drag. Jet thrust and pressure thrust act in a positive or accelerative direction on the aircraft, while ram drag acts to decelerate the aircraft.

Considering the travel of an actual aircraft along an actual runway, it is known that many specific variable factors affect the performance of the aircraft. In addition to the aforementioned factors of thrust and drag, which are largely inherent in the design of a particular type of aircraft, variable factors such as aircraft gross weight, throttle setting, flap setting, meteorological conditions, and the like affect the actual performance of an aircraft each time the aircraft travels along a runway.

While it may be possible to provide a mathematical model predicting aircraft performance as a complex function of all the foregoing factors, aircraft performance is predictable according to the present invention without the need of knowing or utilizing any of the foregoing variable factors, with the exception of certain meteorological conditions. The nature of the meteorological information used in the performance of the present invention readily allows such data to be automatically supplied to calculation apparatus from appropriate meteorological instruments. It has been determined that aircraft velocity, as a function of the distance which the aircraft has traveled from the threshold end of a runway during a certain type of performance such as take-off, is relatively consistent for a given model-type of aircraft. If the velocity-distance function of an aircraft type is known, and if the desired take-off velocity ($V_t$) is also known, then the performance of the aircraft during a take-off run can be predicted by measuring only the velocity and displacement of the aircraft traveling along the runway. If $V_t$ is known in terms of air speed, such $V_t$ must be adjusted for the wind velocity and direction at the location and time of take-off before $V_t$ can be compared with measured ground speed of the aircraft.

Figure 2:
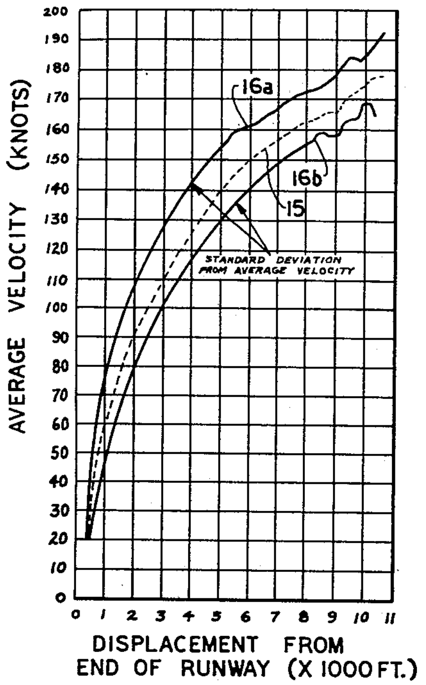
FIG. 2 is a graph depicting an example of the velocity-distance correlation for a particular type of aircraft.

The correlation between aircraft velocity and displacement from the threshold end of the runway is illustrated by the following example based on data acquired from 58 takeoff runs with a Boeing 707-120. Aircraft velocities were measured at 300-foot intervals along a 10,000-foot runway, and means and standard deviations were obtained for data acquired at each 300-foot interval. The resulting data is graphically depicted in FIG. 2, where the mean velocity 15 and plus/minus one standard deviation **16*a* and 16*b* are plotted as a function of displacement from the threshold end of the runway. The 58** take-offs show a surprisingly small standard deviation, even though the take-offs covered an aircraft gross wieght ranging from about 176,000 pounds to about 246,000 pounds, and a temperature range of 50° F. to 98° F. Variations in barometric pressure, throttle setting, and flap setting also occurred in various of the take-off runs. Similar analysis of other aircraft types reveals the existence of correlations or profiles of velocity versus displacement that are applicable to the aircraft type. Consequently, take-off performance can be predicted within acceptable limits without regard to gross weight, throttle setting, flap setting, and other variables, provided that the aircraft type and the wind velocity and direction are known. Correlations with other readily measurable data inputs such as air temperature and barometric pressure can optionally be used to provide further refinement of take-off performance prediction according to the present system. For example, the inclusion of barometric pressure as a data input allows the system of the present invention to adjust predicted take-off performance for the difference in altitude between airports.

Because of the consistent velocity versus displacement profile for a given aircraft type, regardless of the variations in take-off parameters other than velocity, an initial prediction of distance required for lift-off can be made using average correlation parameters for the aircraft type. As an actual aircraft of a known type proceeds along a runway, actual velocity and displacement is measured and the average correlation parameters are adjusted accordingly. The actual take-off roll, and ability to attain take-off velocity before reaching the end of the runway, can be accurately predicted very early in the take-off roll of a specific aircraft of a known type.

The relationship between velocity and runway displacement for many types of aircraft can be accurately represented by the following third-order polynomial:

$$V = F(d) = B_o + B_1 d + B_2 d^2 + B_3 d^3 \quad (3)$$

Where $B_o$, $B_1$, $B_2$ and $B_3$ are constants for a given aircraft type and set of conditions (i.e., flap setting, throttle setting, wind direction/velocity, barometric pressure, ambient temperature and gross weight).

$B_o$, $B_1$, $B_2$ and $B^3$ are computed from actual measured data using the least squares method, known to those skilled in the art.

If the mean velocities for a given aircraft type over the range of possible operating conditions are considered, then it can be shown that $$\hat{V} = \hat{B}_o + \hat{B}_1 d + \hat{B}_2 d^2 + \hat{B}_3 d^3 \quad (4)$$

where $\hat{V}$ = the average velocity at any distance $d$ along the runway with all probable combinations of flap setting, throttle setting, wind velocity and direction, barometric pressure, temperature and gross weights being considered and $\hat{B}_o$, $\hat{B}_1$, $\hat{B}_2$ and $\hat{B}_3$ are constants associated with $\hat{V}$.

Equation (4) may be solved for $d$ to give:

$$d = f(V) \quad (5)$$

where $f(V)$ is a complex function.

Figure 3:
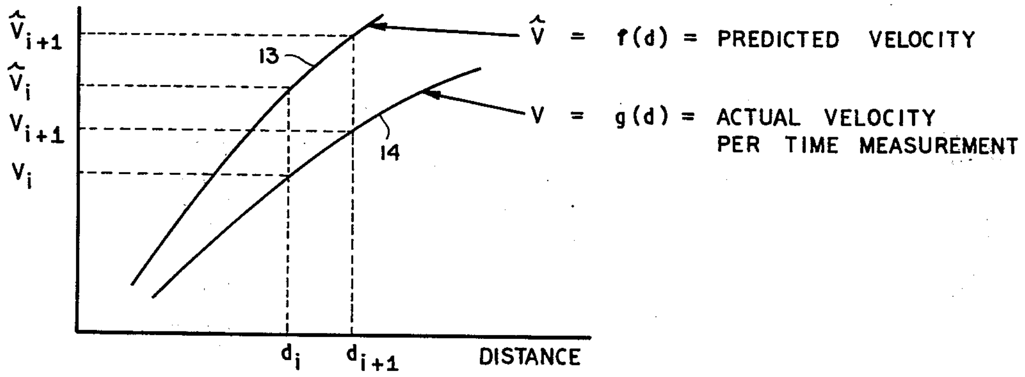
FIG. 3 is a graph showing an example of comparison between predicted velocity and measured velocity according to the present invention.

The following illustrative technique is employed to correct the predicted aircraft velocity versus displacement profile based on actual measurements made during the take-off roll. Corrections are made after measurements are made at each gate along the runway. Referring to the illustrative velocity-distance profile shown in FIG. 3, the plot line 13 represents aircraft performance as predicted according to equation (4) and the plot line 14 represents actual measured velocity of the aircraft at gates $i$ and $(i+1)$.

If $V_i$ and $V_{i+1}$ are measured values of velocity as the aircraft crosses gates $i$ and $(i+1)$ (computed per equation 2); $\hat{V}_i$ and $\hat{V}_{i+1}$ are predicted values of velocity at gates $i$ and $i+1$ (computed per equation 4); and $d_i$ and $d_{i+1}$ are distances of gates $i$ and $i+1$ from runway threshhold; then in general $V = G\hat{V} + Z$, where G = rotation correction and Z = offset correction;

Therefore $$V_i = G\hat{V}_i + Z;\ V_{i+1} = G\hat{V}_{i+1} + Z$$

$$\text{and } G = \frac{V_{i+1} - V_i}{\hat{V}_{i+1} - \hat{V}_i};\ Z = V_{i+1} - G\hat{V}_{i+1}$$

Accordingly, it follows that:

$$V = B'_o + B'_1 d + B'_2 d^2 + B'_3 d^3 \quad (6)$$

Where:

$B'_o = G\hat{B}_o + Z$
$B'_1 = G\hat{B}_1$
$B'_2 = G\hat{B}_2$
$B'_3 = G\hat{B}_3$ Since the take-off performance of an aircraft is determined by its air speed, such reference velocities as take-off velocity ($V_t$) and critical engine failure velocity ($V_c$) are conventionally expressed in terms of the air speed of the aircraft. The values of such reference air speed velocities must be adjusted for measured wind speed (Vw) and wind direction (Θ), in order that the reference velocities, or a reference distance determined as a function of a reference velocity, can be compared with ground speed of the aircraft. The relationship between air speed and ground speed is expressed as:

$$V_g = V_a - V_w \cos\Theta$$

where $V_a$ = air speed
$V_g$ = ground speed

Returning to FIG. 1, the passage of the aircraft along the runway 10 is monitored by the runway crossing gates which provide time-related signals indicating the time when the aircraft crosses each particular gate. Although the gates may be provided by any type of apparatus which senses the presence of an aircraft at a particular location on the runway, each gate is advantageously provided by a source of infrared illumination, such as the source 18, which directs a beam 19 of infrared illumination aimed transverse to the runway and toward a sensor 20 positioned on the opposite side of the runway. Additional details of infrared or photoelectric beam sensors are found in copending U.S. patent application Ser. No. 378,988, filed July 13, 1973 now U.S. Pat. No. 3,872,283. Data from each of the sensors 20 is transmitted by a suitable data link to computational apparatus indicated generally at 21. Each signal provided by one of the sensors 20 is supplied to a signal processor 22, which is also connected to receive a time base input from the clock 23. Since practice of the present system involves mathematical computation to solve the foregoing equations in a sequential manner, such as the manner set forth below, it will be apparent that the computational apparatus shown generally at 21 can be provided by a general purpose digital computer which is suitably programmed. Programming such a computer to accomplish the mathematical computations required to practice the present invention is well within the abilities of those skilled in the art, and the details of such programming are not given herein. It will be understood, of course, that special-purpose computational equipment designed to perform only the specific computational tasks required of the present invention can be used in place of a programmed general-purpose computer.

The remainder of the system depicted in FIG. 1 is now described with reference to a typical sequence of events for take-off performance monitoring. The computational apparatus 21 receives an aircraft type identification input 24, which may be provided either by a keyboard or other manual input or by an automatic aircraft identification system such as the system described in the aforementioned copending patent application. Given the aircraft type input, the computational apparatus 21 obtains the factors $\hat{B}_0$, $\hat{B}_1$, $\hat{B}_2$, and $\hat{B}_3$, which were previously determined for that aircraft type and stored in memory 25. These factors are supplied to the predicted distance means 28, which also receives a manual input signal corresponding to take-off velocity ($V_t$) and manual or automatic input signals corresponding to prevailing wind speed ($V_g$) and wind direction $\ominus$; and the predicted distance means solves the equation (5) to compute the predicted distance $d_t$ required for the identified type of aircraft to take off. $V_t$ is corrected for prevailing wind velocity ($V_w \ominus$) as described above, so that the computed value of take-off distance is the predicted distance which the aircraft will require for take-off in view of prevailing wind conditions. The predicted take-off distance signal is supplied to the distance signal comparator 29 for comparison with the actual length ($d_{end}$) of the runway which is a constant previously inserted into the computational apparatus. If the predicted take-off distance is greater than the actual length of the runway, an alarm signal condition is supplied to the alarm signal 31 associated with the data display 30. The alarm signal 31 immediately notifies the flight crew that the runway is too short for the take-off distance which is predicted for their type of aircraft. The data display 30 is any apparatus which effectively advises the flight crew of the several signal conditions; the data display can be provided by a relatively simple radio link with an on-board receiver and display, or can alternatively be provided by suitable visual signals along the runway. Those skilled in the art will realize that the take-off distance alarm signal may be based on a suitable safety factor, so that an alarm condition is provided if the predicted take-off distance exceeds 90%, for example, of actual runway length.

As the aircraft proceeds along the runway, a signal is generated and transmitted to the signal processor 22 each time the aircraft crosses a gate. The signal processor 22 associates each gate crossing signal with the time that gate crossing occurred, and these times are correlated with the predetermined distances $d_i$ from the distance storage means 33 to provide signals on the data output line 32 consisting of times $t_1, t_2, \ldots t_n$ corresponding to arrival of the aircraft at runway distances $d_1, d_2, \ldots d_n$.

Immediately after the aircraft crosses gate three, for example, the actual acceleration of the aircraft is determined by the acceleration computing means 35, which computes acceleration $A_2$ at the third gate according to equation (1). The computed acceleration signal is supplied to the velocity computing means 34, which computes the actual velocity $V_2$ of the aircraft at the third gate according to equation (2). The predicted velocity $\hat{V}_2$ is also computed at this time by the predicted velocity computing means 36, which functions to solve equation (4). The predicted velocity and the actual velocity signals are supplied to the velocity signal comparison means 37, and an alert output signal condition is supplied to the alert signal 38 of the display 30 if the predicted velocity (which the aircraft should have attained at this distance along the runway) exceeds the actual velocity by more than a predetermined percentage.

The computed actual velocity of the aircraft at this time is supplied to the predicted distance computing means 28, which solves equation (5) to provide an output signal corresponding to the distance remaining from gate 2 to the end of the runway. This predicted remaining-distance signal is compared with the predetermined actual remaining length of the runway, and an alarm signal is provided by the alarm signal 31 if the predicted distance to take-off is less than the actual remaining length of the runway.

The foregoing computations are completed prior to the time the aircraft crosses gate 4. Immediately after gate 4 is crossed, the actual acceleration and velocity of the aircraft are again computed and an alert signal is initiated if the actual velocity is less than the predicted velocity by more than a predetermined percentage. At this time, the two signals for measured velocity $V_2$ and $V_3$ are supplied to the velocity function correction means 42 which computes corrected values of the functions $B'_0$, $B'_1$, $B'_2$, and $B'_3$, according to equation (6). The corrected functions $B'_0 \ldots B'_3$ constitute velocity-distance correlation functions for the particular aircraft currently proceeding along the runway, and these corrected functions are supplied to the predicted distance means 28 to predict the distance which the aircraft must travel beyond gate 3 to reach take-off velocity. This new predicted value of take-off velocity is compared in the comparator 29 with the actual length of runway remaining beyond gate 3, and an alarm signal is generated if the comparison so indicates.

The computational steps described for gate 4 are repeated for each following gate, and the velocity functions are corrected in accordance with computations made corresponding to each such gate. These gate computations are repeated until lift-off occurs or a take-off abort is initiated, as described below. Lift-off is detected by the lift-off computing means 43, which receives the time-distance signals from the signal processor 22. The time to go from a gate $i$ to the next gate $(i+1)$ is estimated as a function of the time required to travel from the preceding gate $(i-1)$. In the disclosed embodiment, a lift-off signal 44 is provided if the $(i+1)$ gate crossing signal is not received within twice the preceding-gate travel time. The lift-off signal can be used to reset the computational apparatus 21 to a condition ready to monitor the performance of another aircraft.

Abort Monitoring

The abort monitoring feature of the present aircraft ground monitoring system can also provide a flight crew with a go-no abort signal based upon a prediction of critical remaining runway distance for an abort maneuver. An aborted take-off, for example, is typically attempted when the flight crew observes an aircraft malfunction such as loss of power in an engine. Under current operating procedures, a critical engine failure velocity ($V_c$) is determined by the flight crew from a set of tables for the particular type of aircraft; $V_c$ listed in the tables is a function of runway altitude, designated runway conditions, aircraft gross weight, ambient temperature, flap setting, and power setting. $V_c$ is supposed to be the maximum velocity at which a take-off can be safely aborted without overruning the ends of the runway. Several important factors, however, such as the actual distance required to reach $V_c$, and runway conditions (wet, dry, or ice) are not considered when $V_c$ is used as the only criterion of safe take-off abort, since the distance required to stop a moving aircraft varies greatly with such runway conditions. During the take-off roll, the flight crew monitors velocity and, after $V_c$ is reached, will normally not attempt to abort the take-off. In reality under certain conditions, however, a safe take-off abort could be made when the aircraft velocity is greater than $V_c$.

Although the ground deceleration of an aircraft is the net result of several decelerating forces, for example, reverse thrust, drag, and braking, it has been determined that a velocity versus runway displacement correlation for deceleration can be determined for aircraft types, in a manner analogous to the above-described aircraft acceleration correlation. Since the effective accelerating force caused by the brakes varies widely with runway conditions, separate velocity displacement correlation are required for differing runway conditions. The air speed-distance correlation for dry runway conditions is represented by the following third order polynomial:

$$d = k_0 + k_1 V + K_2 V^2 + k_3 V^3 \quad (7)$$

Where $k_0$, $K_1$, $K_2$ and $k_3$ are constants for a given aircraft type.

For wet runway conditions, the air speed-distance correlation is represented by:

$$d = G_w(k_0 + k_1 V^2 + k_2 V + k_3 V^3) + Z_w \quad (8)$$

Where $G_w$ and $Z_w$ are correction factors to account for the runway.

The following correlation is used for an icy runway:

$$d = G_I(k_0 + k_1 V + K_2 V^2 + k_3 V^3) + Z_I \quad (9)$$

Where $G_I$ and $Z_I$ are correction factors to account for ice.

Figure 4:
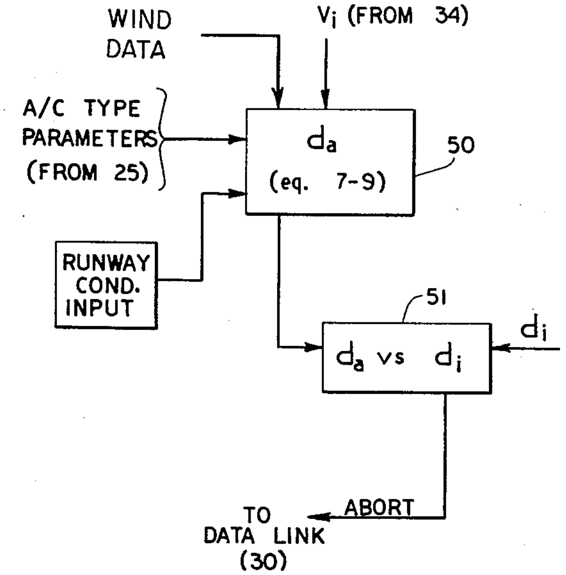
FIG. 4 is a schematic illustration of a modification of the FIG. 1 embodiment, used for monitoring abort conditions.

Referring to FIG. 4, the operation of a take-off abort monitoring sequence commences with computational system inputs of signals corresponding to the particular runway condition, i.e., dry, wet, or ice, and aircraft type identification. The selected runway condition determines the proper one of equations (7) through (9) to be used in determining maximum abort distance and the aircraft type identification enables the appropriate predetermined parameters for the aircraft type and runway condition to be supplied from the stored data memory means 25 to a stopping distance computational means 50 which solves the selected one of equations (7) through (9).

As the aircraft crosses the runway gates during take-off roll, the gate crossing times are determined and the measured velocity ($V_i$) is computed as described above. $V_i$ from the velocity computing means 34, corrected as aforementioned for wind speed and direction, is supplied to the stopping distance computational means 50, and the predicted abort distance ($d_a$) required for the aircraft to decelerate from the $V_i$ to zero is computed. An output signal corresponding to predicted stopping distance $d_a$ is supplied to the distance signal comparator 51 for comparison with the actual distance from the ith runway gate to the end of the runway. If the predicted distance equals or exceeds the actual remaining distance, a signal condition is provided to the abort signal 52.

It will be seen that the present system can predict whether a take-off can be aborted, based on actual aircraft performance. This abort indication enables the flight crew to abort the take-off at the latest possible time, thereby reducing the risk of harm to the aircraft and its occupants.

Since the safe landing roll-out of an aircraft involves the same considerations as abort monitoring, namely, whether there is sufficient remaining runway to decelerate the aircraft to a standstill, the present abort monitoring system is readily usable to monitor aircraft ground roll-out. The type identification of the aircraft H must be entered into the computational system, either manually or automatically as previously discussed, along with updated information describing runway conditions and wind velocity. As soon as the landing aircraft interrupts the runway gates, the sequence of events previously described for take-off abort monitoring takes place and an abort warning is initiated when it is determined that the distance remaining to the end of the runway is insufficient for the aircraft to come to a stop. An indication may also be signalled whenever the aircraft measured velocity and actual position on the runway is such that the landing can no longer safely be aborted (by a full-power take-off maneuver) because the aircraft is too close to the end of the runway to regain take-off velocity.

It is apparent from the foregoing discussion of velocity-distance correlations that the present system requires an initial data base sufficient to provide performance parameters for at least the more popular types of aircraft that will operate at a particular runway, and under the runway conditions to be encountered. Since corrected parameters are generated by the present system for each take-off operation, as in equation (6), the corrected parameters for each operation can preferably be combined with the stored predetermined parameters in a weighted-average manner so that the initial data base is updated and refined by parameters determined as a result of such operation. This continuing and automatic updating of parameters effectively increases the sample size on which the performance correlation for each aircraft is based, so that the correlation is improved.

Intersection Monitoring and Control

Figure 5:
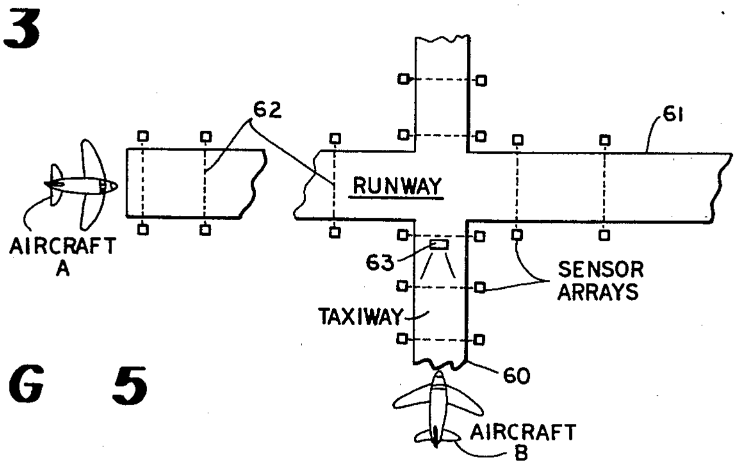
FIG. 5 is a schematic illustration showing the present invention adapted to monitor surface movements of vehicles.

The automatic intersection monitoring and control function of the present aircraft ground monitoring system is designed to guide aircraft safely and efficiently through runway/taxiway and taxiway/taxiway intersections. It is also designed to warn flight crews that an aircraft is about to take off, and that another vehicle is either blocking or crossing the active runway. FIG. 5 shows an illustrative intersection of a taxiway 60 and an active runway 61. An aircraft moving along the active runway is detected by the sensor gates 62 located along the runway. The gate signals are supplied to suitably-programmed computational equipment which provides the necessary signals to control warning (or stop) lights, such as 63, at each controlled intersection along the active runway to be illuminated. These warning lights may be light bars or centerline lights imbedded in the surface of the taxiway near the intersection with the active runway. The pilot of a taxiing aircraft about to cross the active runway would upon observing the illuminated warning lights, stop the aircraft before crossing the runway and would wait until the warning lights are returned to a green or "GO" condition.

Since the present system is capable of detecting the presence of moving vehicles other than aircraft, intersection warnings would also apply to the movement of maintenance vehicles and other moving vehicles on the taxiways and runways. The system can also provide intersection monitoring and control at taxiway/taxiway intersections. Sensor arrays are utilized to detect the approach and presence of aircraft and other vehicles at these intersections. Visual communications such as light bars or imbedded centerline lights, are used to provide appropriate movement control indication to the operators of the vehicles. Several interchangeable strategies can be utilized in controlling the vehicles through intersections. Such strategies could either be selected by the operator or by the computer depending upon operating conditions, time of day, and other factors. These strategies can range from a simple first-come, first-serve logic to more elaborate logic designed to maximize the number of aircraft through an intersection and minimize the blockage of other intersections due to waiting queues. The actual programming of a general-purpose computer to accomplish the selected control strategy is within the skill of the art. Output from the computer can be used to drive a display in the control tower showing movement and instantaneous location of all aircraft and other vehicles on the runways and taxiways. This would be an asset to ground controllers during periods of limited visibility or at times when aircraft are in blind spots and cannot be observed by the ground controller from the control tower. In addition to the display, an alarm can be incorporated into the system to notify the controller when a potential collision situation exists at an intersection. Capability for the controller to override the system will also be provided to allow special or unusual situations to be accommodated, such as disabled aircraft or a particular situation that does not fall into one of the logic schemes prestored in the computer.

The present system can be connected with suitable data recording apparatus to provide a permanent record of the measured and/or predicted performance data signals generated by each operation of the system. The recorded data provides a history of each ground operation, independent of on-board data sensing and recording apparatus, which can be studied for accident investigations and other purposes.

It will be understood that the following relates only to disclosed embodiments of the present invention, and that numerous alterations and modifications may be made therein without departing from the spirit and the scope of the invention as set forth in the following claims.

What is claimed is:

1. The method of predicting the performance of a specific aircraft of determinable certain type which is presently attempting to accomplish a particular flight operation along a runway, comprising the steps of:

prior to the present flight operation, measuring the actual velocities typically attained by aircraft of several types including said certain type, at particular distances while traveling along a runway in the successful accomplishment of a plurality of said particular flight operation, and then obtaining for each such type of aircraft an initial correlation signal between the distances which the aircraft have traveled with respect to a certain reference location of the runway and the typical velocities attained at such distances within a range of possible operating conditions during said plural flight operations, without regard to aircraft operating factors which may have affected the performance of said aircraft while traveling such distances to attain such velocities;

said initial correlation signals for each type of aircraft being represented by the equation:

$$V = B_0 + B_1d + B_2d^2 + B_3d^3$$

where:

V is the average velocity at any distance $d$ along the runway, and $B_0$, $B_1$, $B_2$, and $B_3$ are constants determined from said typical velocity-distance information; and then at the time when said specific aircraft is attempting to accomplish said flight operation, identifying the aircraft type externally of said specific aircraft while said specific aircraft is traveling along the runway;

selecting said initial correlation signal which corresponds to said identified type of aircraft;

determining a signal which corresponds to the actual velocity of said specific aircraft at least at one known location of travel along the runway;

using said selected initial correlation signal to determine a signal corresponding to the anticipated velocity which an aircraft of said identified type should attain at said known location while attempting said flight operation;

comparing said anticipated velocity signal for said certain type of aircraft with said actual velocity signal of the specific aircraft to determine whether the normal velocity bears a predetermined relation to the actual velocity; and providing a signal condition apparent to the operator of the specific aircraft if the anticipated velocity signal does not have said predetermined relationship with the known velocity signal.

2. The method as in claim 1, wherein said steps of determining the actual velocity signal for the specific aircraft, determining the anticipated velocity signal correlated with said known location of the specific aircraft, and comparing said anticipated velocity signal with said actual velocity signal take place externally of said specific aircraft.

3. The method as in claim 2, wherein:

said determination of an anticipated velocity signal for the specific aircraft is a first such determination made for a first known location of travel along said runway, and then determining a signal which corresponds to the actual velocity as said specific aircraft travels to a second known location along said runway;

adjusting said selected initial correlation signal so that said initial correlation represented by said equation substantially coincides with said two actual distances of travel and the actual velocity signals, so that said adjusted correlation signal anticipates the velocity which said specific aircraft should have attained as a function of travel distance along the runway; and then using said adjusted correlation signal to determine the anticipated velocity of said specific aircraft for at least one additional runway location during said attempted flight operation.

4. The method as in claim 1, further comprising the steps of:

after said step of determining the actual velocity signal, then using said selected initial correlation signal to determine a distance signal correlated with said actual velocity signal to anticipate the distance which said identified type of aircraft should have traveled along the runway to attain said actual velocity;

comparing said anticipated distance for said identified type of aircraft with said reference location along the runway of the specific aircraft to determine whether the anticipated distance traveled bears a predetermined relation to the actual distance traveled; and providing a signal condition apparent to the operator of the specific aircraft if the anticipated distance does not have said predetermined relationship with the actual distance.

5. The method as in claim 4, wherein:

said particular flight operation is a take-off;

said anticipated distance is a function of the the distance which said identified type of aircraft must travel from said known location to become airborne; and said actual distance is a function of the length of the runway remaining from said known location.

6. The method as in claim 4, wherein:

said particular flight operation is a landing;

said anticipated distance is a function of the distance which said identified type of aircraft must travel from said known location to stop; and said actual distance is a function of the length of runway remaining from said known location.

7. The method as in claim 1, wherein said constants $B_0$, $B_1$, $B_2$, and $B_3$ are determined from said typical information by least squares methodology.

8. The method of predicting the performance of a specific aircraft of determinable certain type which is presently attempting to accomplish a particular flight operation along a runway, comprising the steps of:

prior to the present flight operation, determining the velocities typically attained by aircraft of several types including said certain type at particular distances while traveling along a runway in the successful accomplishment of said particular flight operation, and then obtaining for each type of aircraft as initial correlation signal between the distances which the aircraft have traveled with respect to a certain reference location of the runway and the typical velocities attained at such distances within a range of possible operating conditions, without regard to aircraft operating factors which may have affected the performance of such aircraft while traveling such distances to attain such velocities;

said initial correlation signals for each type of aircraft being represented by the equation:

$$V = B_0 + B_1d + B_2d^2 + B_3d^3$$

where:

$V$ is the average velocity at any distance $d$ along the runway, and $B_0$, $B_1$, $B_2$, and $B_3$ are constants determined from said typical velocity-distance information; and at the time when said specific aircraft is attempting to accomplish said flight operation, identifying the aircraft type externally of said specific aircraft while said specific aircraft is traveling along the runway;

selecting said initial correlation signal which corresponds to said identified type of aircraft;

determining the actual velocity of said particular aircraft at least at one known location of travel along the runway;

using said selected initial correlation signal to determine the anticipated distance which an aircraft of said identified type should have traveled along the runway to attain said actual velocity;

comparing said anticipated distance for said certain type of aircraft with said actual location along the runway of the specific aircraft to determine whether the anticipated distance traveled bears a predetermined relation to the actual distance traveled; and providing a signal condition apparent to the operator of the specific aircraft if the anticipated distance does not have said predetermined relationship with the actual distance.

9. The method as in claim 8, wherein said flight operation is an aircraft landing operation, said anticipated distance is the distance required to stop aircraft of the identified type, and said actual distance is the distance required to stop said specific aircraft.

10. The method as in claim 8, wherein said method steps take place externally of the aircraft.

11. The method of predicting the performance of a specific aircraft of determinable certain type which is presently attempting to accomplish a particular flight operation along a runway, comprising the steps of:

prior to the present flight operation, measuring the actual velocities typically attained by aircraft of several types, including said certain type, at particular distances while traveling along a runway in the successful accomplishment of a plurality of said particular flight operation, and then obtaining for separate each such type of aircraft an initial correlation signal between the distances which the aircraft have traveled with respect to a certain reference location of the runway and the velocities attained at such distances within a range of possible operating conditions during said plural flight operations, without regard to aircraft operating factors which may have affected the performance of said aircraft while traveling such distances to attain such velocities; and then at the time when said specific aircraft is attempting to accomplish said flight operation, identifying the aircraft type externally of said specific aircraft while said specific aircraft is traveling along the runway;

selecting said initial correlation signal which corresponds to said identified type of aircraft;

determining a signal which corresponds to the actual velocity of said specific aircraft at least at one known location of travel along the runway;

using said selected initial correlation signal to determine a signal corresponding to the anticipated velocity which an aircraft of said identified type should attain at said known location while attempting said flight operation;

comparing said anticipated velocity signal for said certain type of aircraft with said actual velocity signal of the specific aircraft to determine whether the normal velocity bears a predetermined relation to the actual velocity;

providing a signal condition apparent to the operator of the specific aircraft if the anticipated velocity signal does not have said predetermined relationship with the known velocity signal;

said determination of an anticipated velocity signal for the specific aircraft is a first such determination made for a first known location of travel along said runway, and then determining a signal which corresponds to the actual velocity as said specific aircraft travels to a second known location along said runway;

adjusting said selected initial correlation signal to substantially coincide with said two actual distances of travel and the actual velocity signals, so that said adjusted correlation signal anticipates the velocity which said specific aircraft should have attained as a function of travel distance along the runway; and then using said adjusted correlation signal to determine the anticipated velocity of said specific aircraft for at least one additional runway location during said attempted flight operation.

* * * * *